UNITED STATES PATENT OFFICE.

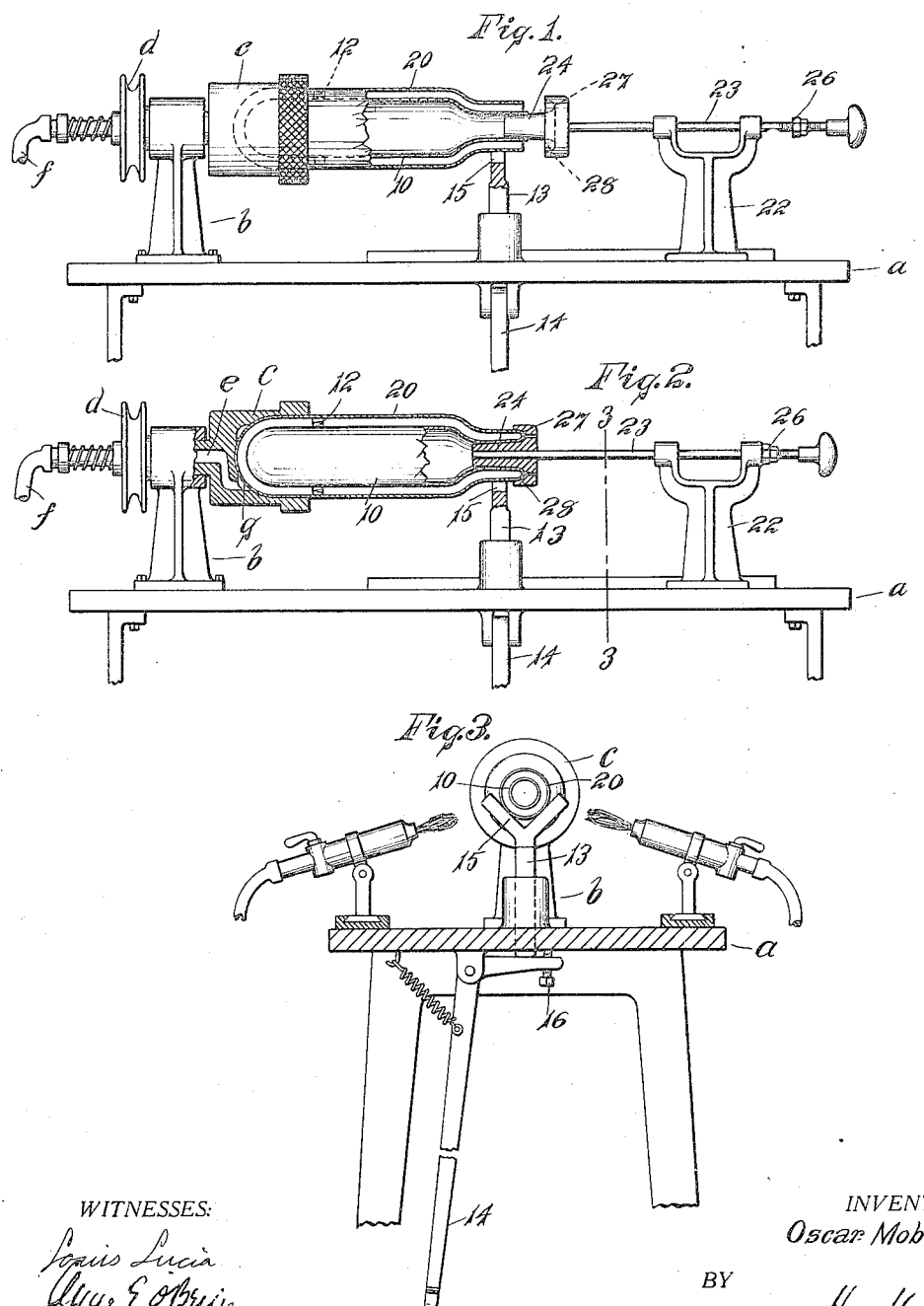

OSCAR MOBERG, OF NEW BRITAIN, CONNECTICUT, ASSIGNOR TO LANDERS, FRARY & CLARK, OF NEW BRITAIN, CONNECTICUT, A CORPORATION OF CONNECTICUT.

APPARATUS FOR THE MANUFACTURE OF GLASSWARE.

1,242,837.

Specification of Letters Patent.

Patented Oct. 9, 1917.

Application filed November 12, 1915. Serial No. 61,048.

*To all whom it may concern:*

Be it known that I, OSCAR MOBERG, a citizen of the United States, and a resident of New Britain, in the county of Hartford, State of Connecticut, have invented certain new and useful Improvements in Apparatus for the Manufacture of Glassware, of which the following is a specification.

This invention relates particularly to the manufacture of vacuum receptacles, and has for its object the provision of means which permit of producing a product of uniform size and construction. It relates particularly to the apparatus wherein the bottom of the outer blank of a vacuum receptacle is closed in before the two blanks are joined at the neck, and provides means for centering the blanks relative to one another, and for producing the finished articles of uniform size, particularly as to length.

In the drawings—

Figure 1 is a side view showing the apparatus, part of the bottle being shown in section.

Fig. 2 is a view similar to Fig. 1, but with some of the parts shown in section.

Fig. 3 is an end view on the line 3—3 of Fig. 2.

Referring to the drawings, $a$ denotes the table or base which supports the apparatus, $b$ is a standard to provide a bearing in which the chuck $c$ is rotatably mounted, being driven in any desired manner as by a belt running in the groove pulley $d$. The interior of the chuck is shaped to conform to the shape of the bottom of the outer blank, and has an air passage $e$ through it connected with a supply pipe $f$, the outer blank being apertured as at $g$ so that air introduced through the supply pipe $f$ will enter the space between the blanks for the purpose which will be later described.

The inner blank 10 is held within the outer blank 20 by the supports 12. 13 is a gage mounted on the base and vertically movable as by the foot lever 14. This gage has a V-shaped head 15, and the extent of its elevation is determined by the stop 16, so that when the gage is raised the neck of the outer blank can be brought down to rest in the gage and be thus positioned in axial alinement with the chuck. Mounted in the standard 22 is a sliding rod 23, having at its forward end a gage plug 24 which is of a size to enter the neck of the inner blank, and this rod being in axial alinement with the chuck permits of bringing the inner blank into proper position relative to the outer blank, so that the two blanks will be maintained substantially concentric. Heat is now applied to the necks to soften the glass so that the two blanks may be joined together after which the rod 23 is moved forward up to the stop 26, introducing the plug 24 into the neck of the inner blank. Back of the plug is a mold 27 having an annular channel 28 of the desired shape of the finished neck or lip of the receptacle. When this mold is moved down to position as illustrated in Fig. 2, air is introduced into the space between the blanks, forcing the glass into the mold and giving the proper finished shape to the lip. The distance between the base of the chuck $c$ and the mold 27 being always the same because of the gaging stop 26, a uniform length of the receptacles is assured, and the gages 13, 24, insure that the two blanks shall be concentric, with the result that a very uniform product is secured.

I am aware that the apparatus here illustrated and described is susceptible of modification without departing from the spirit of the invention as defined in the appended claims.

I claim as my invention:

1. In an apparatus of the character described, a chuck and means for rotating it, said chuck adapted to receive and hold the bottom of an outer blank, within which is positioned an inner blank supported and spaced from the outer blank, and means for bringing the neck ends of the blanks into proper position relative to one another, said means comprising a vertically movable gage for positioning the outer blank with means for limiting the extent of said vertical movement, and a second gage movable independently of the first and axially of the chuck for coöperation with the inner blank to correctly position it relative to the outer blank.

2. In an apparatus of the character described, a rotatable chuck adapted to receive and grip the outer of a pair of associated blanks closed at their bottoms, the inner blank being supported within and properly spaced from the outer blank, a gage movable axially of said chuck and adapted to engage the neck of the inner blank, and a second gage vertically movable for engagement with the neck of the outer blank, and means for limiting the upward movement of said vertically moving gage.

OSCAR MOBERG.

Witnesses:
 EDWARD HOOGE,
 JOHN A. BERTINI.